A. PAUL.
NUT-LOCK.
No. 176,993. Patented May 2, 1876.
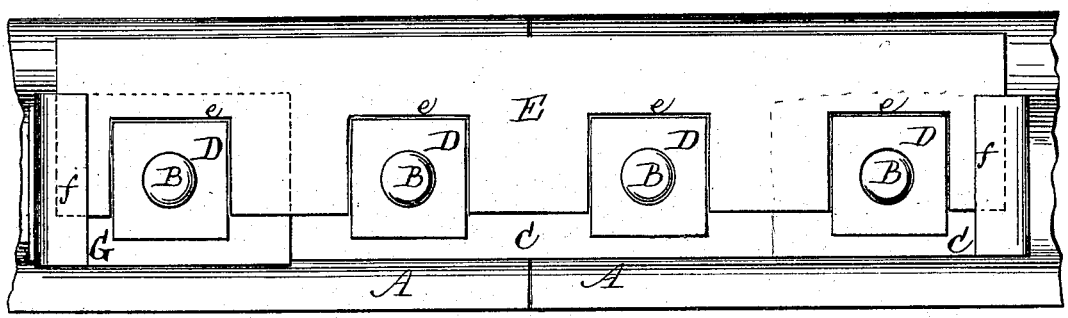
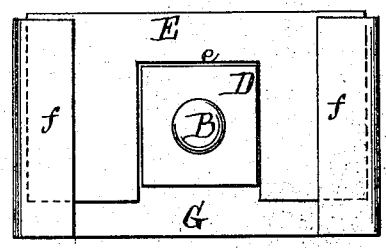 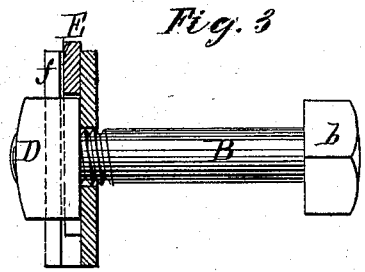
Witnesses:
Michael Ryan
Fred Haynes
Alexander Paul
by his Attorneys
Brown & Allen

UNITED STATES PATENT OFFICE.

ALEXANDER PAUL, OF MEYERSDALE, PENNSYLVANIA, ASSIGNOR TO THOMAS H. PAUL, OF FROSTBURG, MARYLAND.

IMPROVEMENT IN NUT-LOCKS.

Specification forming part of Letters Patent No. 176,993, dated May 2, 1876; application filed May 21, 1875.

*To all whom it may concern:*

Be it known that I, ALEXANDER PAUL, of Meyersdale, in the county of Somerset and State of Pennsylvania, have invented an Improvement in Rail-Joint Fastenings; and I do hereby declare that the following is a full, clear, and exact description of the same, reference being had to the accompanying drawing, which forms part of this specification.

My invention relates to a means for preventing nuts and bolt-heads from turning, which is designed more particularly for application to fish-joints, but which may be applied to a single bolt or nut.

The invention consists in the combination, with the nut or bolt-head, of a notched plate for preventing the nuts or bolts from turning and an overlapping plate for holding said notched plate in place.

In the accompanying drawing, Figure 1 is a side view, showing the application of my invention to a rail-joint. Fig. 2 is a similar view, showing the application to a single bolt. Fig. 3 is a transverse vertical section.

A A represent the ends of two contiguous rails, fastened by bolts B passing through them, and through a fish-plate, C, and provided with nuts D. E represents a plate, provided with a notch or notches, e, corresponding with the shape and size of the nut D or bolt-head b. G is a plate interposed between the notched plate E and the fish-plate C.

When the bolts and nuts are secured in place, the notched plate E is placed in the position shown in Fig. 1, with the notches e engaged with the nuts D, by which means they are prevented from turning. The end of the plate G is then bent, as shown at f, so as to overlap the end of the notched plate E, by which means the latter is held in place.

When the notched plate is applied to the nut, the bolt may have a portion of the body angular, to fit a hole of corresponding shape, or may have its head countersunk to prevent the bolt from turning; or the notched plate may be applied to the bolt-head b, and the nut may be countersunk.

If desired, the notched plates may be applied to both sides of the fish-joint, one engaging with the nuts, and the other with the bolt-heads.

In some cases the interposed plate G may be dispensed with, and the end of the fish-plate may be bent to overlap the notched plate E, as shown at f, at the right-hand end of Fig. 1.

When the invention is applied to a single bolt and nut, the plate E is formed with a single notch, and both ends of the plate G may be bent to overlap it, as shown in Fig. 2. In such case the plate G may serve instead of a washer.

What I claim as new, and desire to secure by Letters Patent, is—

The combination of the plate G, constructed with the end flanges f, with the plate E, constructed with notches e, to fit the nuts confining the rail-sections together, and having its ends overlapped by the flanges f on the plate G, as shown and described.

ALEXR. PAUL.

Witnesses:
 ALEXR. WALKER,
 JOSIAH MILLER.